United States Patent
Sharma et al.

(10) Patent No.: US 7,433,879 B1
(45) Date of Patent: Oct. 7, 2008

(54) ATTRIBUTE BASED ASSOCIATION RULE MINING

(75) Inventors: Nirad Sharma, Austin, TX (US); Rohit Namjoshi, Austin, TX (US); David Franke, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 475 days.

(21) Appl. No.: 10/870,360

(22) Filed: Jun. 17, 2004

(51) Int. Cl.
G06F 17/30 (2006.01)

(52) U.S. Cl. .............................. 707/101; 707/6; 707/5; 707/3

(58) Field of Classification Search ...... 707/6, 707/5, 101, 3
See application file for complete search history.

(56) References Cited

U.S. PATENT DOCUMENTS

| | | | | |
|---|---|---|---|---|
| 6,629,095 | B1 * | 9/2003 | Wagstaff et al. ............... | 707/5 |
| 6,697,802 | B2 * | 2/2004 | Ma et al. ........................ | 707/6 |
| 6,990,486 | B2 * | 1/2006 | Ma et al. ........................ | 707/6 |
| 2002/0198877 | A1 * | 12/2002 | Wolff et al. .................... | 707/6 |
| 2003/0009456 | A1 | 1/2003 | Shintani et al. ................ | 707/6 |
| 2003/0023591 | A1 * | 1/2003 | Ma et al. ........................ | 707/6 |
| 2003/0078686 | A1 * | 4/2003 | Ma et al. ........................ | 700/91 |
| 2003/0217055 | A1 | 11/2003 | Lee et al. ........................ | 707/6 |
| 2003/0236785 | A1 * | 12/2003 | Shintani et al. ................ | 707/6 |
| 2004/0049504 | A1 | 3/2004 | Hellerstein et al. ............. | 707/5 |
| 2005/0027710 | A1 * | 2/2005 | Ma et al. ........................ | 707/100 |
| 2005/0044073 | A1 * | 2/2005 | Inokuchi ........................ | 707/3 |
| 2007/0250522 | A1 * | 10/2007 | Perrizo ........................ | 707/101 |

OTHER PUBLICATIONS

U.S. Appl. No. 10/099,404, filed Mar. 15, 2002, Darr et al.

R. Agrawal et al., "Mining Association Rules Between Sets of Items in Large Databases," Proceedings of ACM SIGMOD Int'l Conference on Management of Data, pp. 207-216 (1993).

J. Han et al., "Mining Frequent Patterns Without Candidate Generation," Proceedings of ACM SIGMOD Int'l Conference on Management of Data, pp. 1-12 (2000).

J. Han, et al., "Mining Frequent Patterns Without Candidate Generation," ftp://ftp.fas.sfu.ca/pub/cs/han/slides/alamden00/ppt.

B. Goethals, "Survey on Frequent Pattern Mining," HIIT Basic Research Unit, Department of Computer Science, University of Helsinki, Finland (2003).

"Association Rule Mining," COMP 290-90 Seminar, University of North Carolina at Chapel Hill, Fall 2003, http://www.cs.unc.edu/Courses/comp290-90-f03/associationrule1.pdf.

(Continued)

*Primary Examiner*—John Cottingham
*Assistant Examiner*—Noosha Arjomandi
(74) *Attorney, Agent, or Firm*—Hamilton & Terrile, LLP; Michael Rocco Cannatti (57) ABSTRACT

A data processing system processes data sets (such as low-resolution transaction data) into high-resolution data sets by mapping generic information into attribute-based specific information that is stored in a database. The extracting frequent pattern information from the database using frequent pattern growth techniques, a compact frequent pattern tree data structure efficiently holds frequent pattern information for multiple transactions having one or more items in each transaction. Frequent pattern data is transformed for ease of use with rule generation algorithms by removing redundant information (such as part group items) or by consolidating items corresponding to a part group and replacing those items with a proxy item for purposes of power set generation.

16 Claims, 4 Drawing Sheets

OTHER PUBLICATIONS

X. Shang, et al., "SQL Based Frequent Pattern Mining Without Candidate Generation" (Poster Abstract) ACM Symposium of Applied Computing, pp. 618-619 (Mar. 2004).

J. Han et al., "Data Mining: Concepts and Techniques," Department of Computer Science, University of Illinois at Urbana-Champaign, http://people.sabanciuniv,edu/~ysaygin/courses/datamining/lecture%20notes.lec1.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec2.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes/lec3.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec4.ppt.

* cited by examiner

ATTRIBUTE BASED ASSOCIATION RULE MINING

BACKGROUND OF THE INVENTION

1. Field of the Invention

The present invention relates in general to the field of database analysis. In one aspect, the present invention relates to a system and method for data mining operations for identifying association rules contained in database records.

2. Description of the Related Art

The ability of modem computers to assemble, record and analyze enormous amounts of data has created a field of database analysis referred to as data mining. Data mining is used to discover association relationships in a database by identifying frequently occurring patterns in the database. These association relationships or rules may be applied to extract useful information from large databases in a variety of fields, including selective marketing, market analysis and management applications (such as target marketing, customer relation management, market basket analysis, cross selling, market segmentation), risk analysis and management applications (such as forecasting, customer retention, improved underwriting, quality control, competitive analysis), fraud detection and management applications and other applications (such as text mining (news group, email, documents), stream data mining, web mining, DNA data analysis, etc.). For example, association rules have been applied to model and emulate consumer purchasing activities. Association rules describe how often items are purchased together. For example, an association rule, "laptop $\Rightarrow$ speaker (80%)," states that four out of five customers that bought a laptop computer also bought speakers.

The first step in generating association rules is to review a database of transactions to identify meaningful patterns (referred to as frequent patterns, frequent sets or frequent itemsets) in a transaction database, such as significant purchase patterns that appear as common patterns recurring among a plurality of customers. Typically, this is done by using thresholds such as support and confidence parameters, or other guides to the data mining process. These guides are used to discover frequent patterns, i.e., all sets of itemsets that have transaction support above a predetermined minimum support S and confidence C threshold. Various techniques have been proposed to assist with identifying frequent patterns in transaction databases, including using "Apriori" algorithms to generate and test candidate sets, such as described by R. Agrawal et al., "Mining Association Rules Between Sets of Items in Large Databases," Proceedings of ACM SIGMOD Int'l Conf. on Management of Data, pp. 207-216 (1993). However, candidate set generation is costly in terms of computational resources consumed, especially when there are prolific patterns or long patterns in the database and when multiple passes through potentially large candidate sets are required. Other techniques (such as described by J. Han et al., "Mining Frequent Patterns Without Candidate Generation," Proceedings of ACM SIGMOD Int'l Conf. on Management of Data, pp. 1-12 (2000)) attempt to overcome these limitations by using a frequent pattern tree (FPTree) data structure to mine frequent patterns without candidate set generation (a process referred to as FPGrowth). With the FPGrowth approach, frequency pattern information is stored in a compact memory structure.

Once the frequent sets are identified, the association rules are generated by constructing the power set (set of all subsets) of the identified frequent sets, and then generating rules from each of the elements of the power set. For each rule, its meaningfulness (i.e., support, confidence, lift, etc.) is calculated and examined to see if it meets the required thresholds. For example, if a frequent pattern {A, B, C} is extracted—meaning that this set occurs more frequently than the minimum support S threshold in the set of transactions—then several rules can be generated from this set:

{A} $\Rightarrow$ {B,C}
{B} $\Rightarrow$ {A,C}
{C} $\Rightarrow$ {A,B}
{A,B} $\Rightarrow$ {C}
etc.

where a rule A $\Rightarrow$ B which indicates a "Product A is often purchased together with Product B," meaning that there is an association between the sales of Products A and B. Such rules can be useful for decisions concerning product pricing, product placement, promotions, store layout and many other decisions.

Conventional data mining approaches use generic item descriptions, such as the SKU (stockable unit number) when identifying items or products in a transaction database. When these generic descriptions are used to identify frequent sets, the frequent sets are not large and power-set/rule generation is tractable. However, conventional implementations of FPGrowth mining techniques using item data at the SKU (stockable unit number) level do not provide sufficient information to develop meaningful association rules for complex products. For example, if there are three transactions involving the purchase of a computer identified as "Desktop-SKU" with one of the transactions also involving the purchase of DVD disks, the product level of description used to identify the computer does not reveal that two of the computers did not include DVD drives, while the third computer (which was purchased with the DVD disks) did include a DVD drive. As this example demonstrates, this lack of granularity in the item description diminishes the quality of association rules that can be generated, resulting in limited pattern correlation.

As seen from the conventional approaches, a need exists for methods and/or apparatuses for improving the extraction of frequent patterns for use in data mining. There is also a need for finer granularity in the generation of frequent sets to better discover meaningful patterns without imposing the cost of a combinatorial explosion of the data that must be examined. In addition, there is a need for methods and/or apparatuses for efficiently generating association rules without requiring unwieldy candidate set generation, without requiring multiple database passes and without requiring additional time to generate association rules as the frequent set grows. Further limitations and disadvantages of conventional systems will become apparent to one of skill in the art after reviewing the remainder of the present application with reference to the drawings and detailed description which follow.

SUMMARY OF THE INVENTION

In accordance with one or more embodiments of the present invention, a system and method are provided for generating more meaningful frequent set data by providing finer granularity in the item descriptions used to generate frequent sets and by simplifying the rule generation process to expedite association rule mining by consolidating the power set generation process by using only product groupings. In a selected embodiment, improved pattern correlation is provided by representing items in terms of their features so that a part or product may be represented in terms of its part group and various attribute-value pairs. This approach provides sufficient detail so that association rule mining can be used for complex products. Any additional complexity in the frequent sets that could impede the rule generation stage may be addressed by selectively reducing the size of the frequent set, such as by eliminating redundant or generic items from the frequent set, and by consolidating items in the frequent set during the power set generation phase of rule generation.

In accordance with various embodiments of the present invention, a method and apparatus are provided for mining attribute based association rules by transforming or mapping transaction items (such as purchase items identified in a transaction database with a part number descriptor) into a transformed data set that includes a part group item and a plurality of attribute-based items corresponding to the individual transaction items. For example, an address mapper is used to generate an attribute-based data set based on attribute values corresponding to the part number descriptor. Using a frequent pattern tree, the transformed data set may be processed to identify a frequent set. A rule generator generates association rules from the frequent set by consolidating any attribute-based items in the frequent set, such as by replacing attribute-based items that correspond to a part number descriptor with a corresponding proxy item to form a reduced frequent set. By using the reduced frequent set to generate a power set, rule generation is expedited. After the power set is generated, the power set is expanded by replacing any proxy item with its corresponding attribute-based items, thereby forming an expanded power set. One or more threshold tests may then be applied to the expanded subset to identify attribute based association rules.

The objects, advantages and other novel features of the present invention will be apparent from the following detailed description when read in conjunction with the appended claims and attached drawings.

DETAILED DESCRIPTION

An efficient database mining method and apparatus is described for generating attribute-based frequent patterns from transaction databases and efficiently deriving association rules from the detailed frequent patterns. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
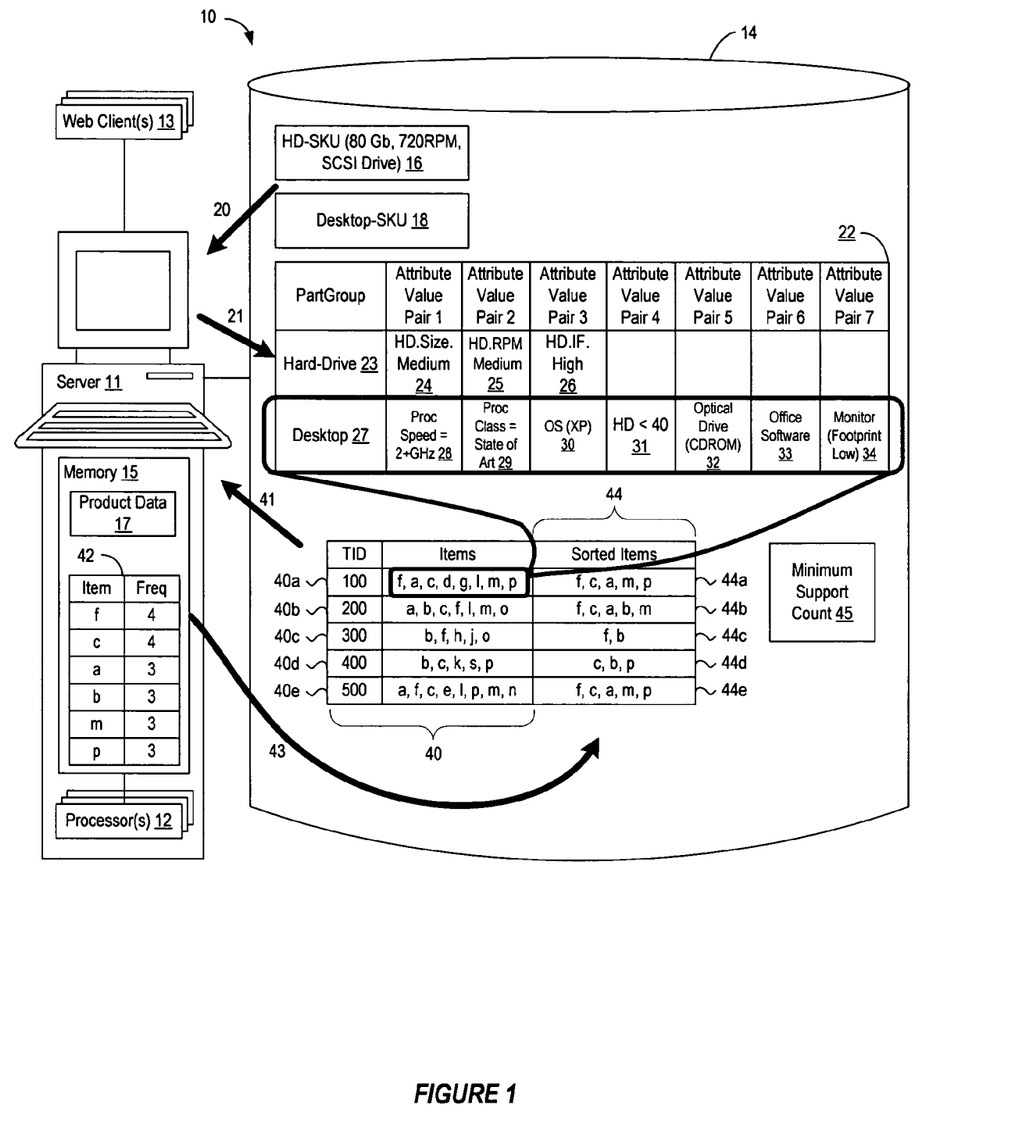
FIG. 1 illustrates an exemplary system for generating high-resolution product information that may be used for mining detailed frequent pattern information.

Referring now to FIG. 1, a block diagram illustrates an exemplary data processing system 10 in which the present invention may be practiced by mapping or otherwise transforming a first data set of transaction information into a second data set of transaction information that provides more detailed information specifying the attributes of the purchased product. In a selected application, the second data set of transaction information may be used to generate cross-sell and up-sell recommendations based on frequent patterns mined from an order history store in a transaction database. By providing greater granularity to the transaction data, pattern correlation is improved by representing items in terms of their features so that a part or product may be represented in terms of its part group and various attribute-value pairs. For example, if there are three transactions involving the purchase of a computer with the third transaction also involving the purchase of DVD disks, by including an identification for each computer item of whether it includes a DVD drive (e.g., Computer.DVDrive.No for the first and second computers and Computer.DVDrive.Yes for the third computer), sufficient detail is provided to enable more accurate correlation between the computer and disk purchases when generating association rules.

In the example depicted in FIG. 1, the data processing system 10 (e.g., a private wide area network (WAN) or the Internet) includes a central server computer system 11 and one or more networked client or server computer systems 13 that are connected to the network. Communication between central server computer system 11 and the networked computer systems 13 typically occurs over a network, such as a public switched telephone network over asynchronous digital subscriber line (ADSL) telephone lines or high-bandwidth trunks, for example, communications channels providing T1 or OC3 service. Networked client computer systems (e.g., 13) typically access central server computer system 11 through a service provider, such as an internet service provider ("ISP") by executing application specific software, commonly referred to as a browser, on the networked client computer systems 13.

In a selected embodiment, a first data set of transaction information is stored in a database 14 that may be accessed directly or indirectly by the server 11. In this example, the first data set identifies the items included in a plurality of transactions by including a generic product descriptor 16, 18 for each transaction item, such as the SKU (stockable unit number) for a purchased product. Thus, a hard drive that was purchased is identified with the hard drive SKU (stockable unit number) 16 and a desktop computer is identified with the desktop SKU 18. In accordance with an embodiment of the present invention described herein, the first data set of transaction information may be mapped or otherwise transformed into a second data set of transaction information that provides more detailed information identifying with greater specificity the attributes of the purchased product. In a selected embodiment, the data transformation is implemented with a computer or other data processing functionality (e.g., server 11) which loads a copy of the first data set 16, 18 from a database 14 into local memory 15, as indicated with arrow 20. Using a product detail knowledge database (such as contained in product data memory 17) that specifies various product feature details for each transaction item, the server 11 maps or transforms the generic product descriptors of the first data set into a second data set that specifies additional details and/or features for the item of interest, such as more detailed product descriptor information. In the depicted embodiment, part numbers in an order (e.g., 16, 18) may be mapped to a Part Group identifier and to a set of attribute names and values (e.g., 23, 27, respectively) and stored in the database 14, as indicated with arrow 21.

With reference to the example depicted in FIG. 1, an 80 Gb, 7200 RPM, SCSI drive identified with the HD-SKU 16 could be mapped to the following attribute-based transaction items:
_Hard_Drive
_Hard_Drive._Size. 80 Gb
_Hard_Drive. RPM. 7200
_Hard_Drive._Interface.SCSI These items are included in a second data set 22 as an entry 23-26 which quantifies the consumer preferences for one or more products and associated product features and which is organized or stored in a structured format, such as a database or table. In this example, the original item description 16 is now expanded and represented by a Part Group identifier 23 and three attribute items 24, 25, 26. In similar fashion, the original item description 18 for a desktop computer is expanded and represented by a Part Group identifier 27 and seven attribute items 28-34 (in this example) that are stored as an entry in the second data set 22. These additional attribute items 28-34 specify the processor speed 28, processor class 29, operating system type 30, hard drive size 31, optical drive type 32, software package type 33, and monitor type 34 for the desktop item.

While the additional product detail information contained in the second data set has many potentially useful and interesting applications, it can be used in transaction database applications to provide more meaningful frequent pattern analysis. As will be appreciated by those of ordinary skill in the art, frequent patterns or itemsets may be constructed using data mining techniques to find interesting patterns from databases, such as association rules, correlations, sequences, episodes, classifiers, clusters and the like. The task of discovering and storing all frequent patterns from a database of items is quite challenging, given that the search space is exponential in the number of items occurring in the database.

A selected embodiment of the present invention addresses this challenge by using only two passes of the second data set information to provide a compact in-memory representation of the transaction database using FPTree and FPGrowth techniques, though there are a variety of techniques available for counting the support in a database for all generated frequent patterns. With the FPGrowth technique, unnecessary generation of candidate sets may be avoided. Instead of storing the cover for every item in the database, the FPGrowth technique stores the actual transactions from the database in a trie structure wherein every item has a linked list going through all transactions that contain that item. This data structure is referred to as a Frequent Pattern tree (FPTree).

To construct an FPTree, the second data set is included as part of a transaction database 40 which includes a plurality of entries 40*a-e*. An important consideration with data mining applications is the representation of the transaction database 40. Conceptually, such a database can be represented by a binary two-dimensional matrix in which every row (e.g., 40*a*) represents an individual transaction (with a transaction identifier (e.g., TID 100)) and the columns represent the items in the transaction (e.g., f, a, c, d, g, l, m, p). Such a matrix can be implemented in several ways. The most commonly used layout is the horizontal data layout. That is, each transaction has a transaction identifier and a list of items occurring in that transaction. Another commonly used layout is the vertical data layout, in which the database consists of a set of items, each followed by its cover.

Referring again to FIG. 1, the server 11 begins the process of constructing an FPTree by retrieving the item descriptors from the transaction database 40 and a minimum support count 45, as indicated with arrow 41. The server 11 then performs a first scan of the database 40 to obtain the frequency count of each item. For all items in the database 40 with a frequency meeting or exceeding the minimum support count requirement (e.g., the minimum support count is 3), a header table 42 is built in the memory 15 that contains the item (e.g., item f) and its frequency count (e.g., 4). In the header table 42, the entries are sorted in decreasing frequency order.

Once the header table 42 is built, the server 11 then performs a second scan of the database 40 to build an FPTree identifying the frequent patterns. As will be understood by those of ordinary skill in the art, as a preliminary step, the frequent items for each transaction contained in a database entry (e.g., items f, a, c, d, g, l, m and p in entry 40*a*) are sorted based on the item order of the header table 42. In the example of FIG. 1, with the header table order being "f, c, a, b, m, p," the items in entry 40*a* are sorted and stored in the database 44 as "f, c, a, m, p" in entry 44*a*. Using the information in the header table 42, the server 11 creates a list of sorted items for each transaction in the database and stores the sorted item list 44 in the memory 15 or the database 14, as indicated with arrow 43. As a second step, the transactions with identical item sets are merged in the FPTree by incrementing the counter values for the merged item set. And as a final step, the FPTree is constructed so that transactions with the same prefix share the same path in the tree.

Figure 2:
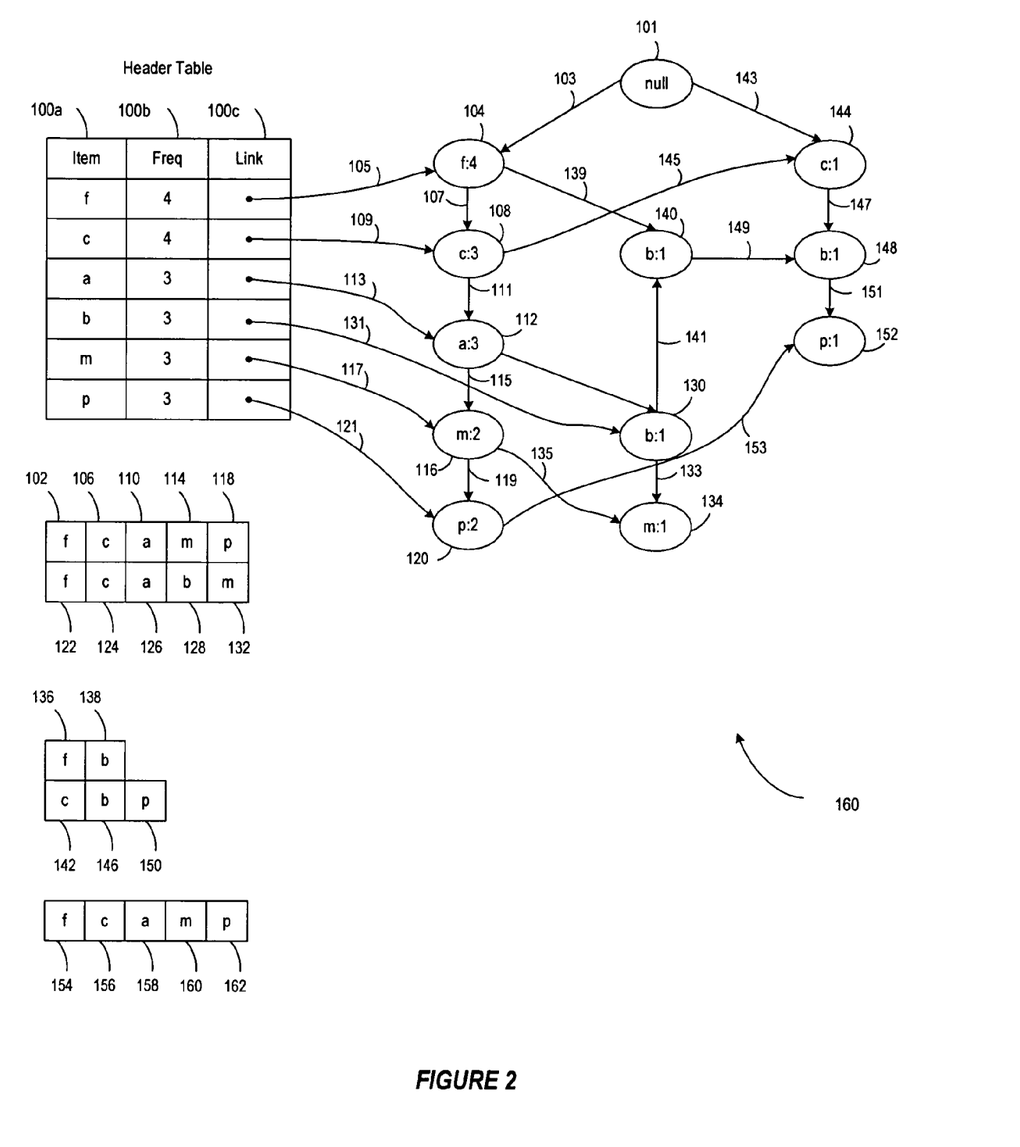
FIG. 2 illustrates the construct of an exemplary FP-tree.

The construction of an exemplary FPTree 160 is illustrated in FIG. 2 with reference to the entries depicted in the transaction database 40 shown in FIG. 1. To build the FPTree 160, a data structure is stored in memory that identifies a root 101 of the tree, which is labeled "null" in FIG. 2. The FPTree contained in the data structure is then constructed by defining various nodes and branches that connect to the root 101 of the tree. In particular, for each transaction in the database, the items are processed in reverse order (hence, support decreasing) and a branch is created for each transaction. Every node in the FPTree stores a counter which keeps track of the number of transactions that share that node, and may also store a pointer to other nodes for that item. Specifically, when considering the branch to be added for a transaction, the count of each node along the common prefix is incremented by 1, and nodes for the items in the transaction following the prefix are created and linked accordingly. Additionally, an item header table 100 is built so that each item points to its occurrences in the tree via a chain of node-links 100*c*. Each item in this header table also stores its support (e.g., in the Freq field 100*b*). The reason to store transactions in the FPTree in support-decreasing order is to keep the FPTree representation of the database as small as possible since the more frequently occurring items are arranged closer to the root of the FPTree, and thus are more likely to be shared.

As an example implementation of the FPTree construction process, for each transaction in the database 40, the transaction items (e.g., the items in entry 40*a*) that are not in the header table 42 are ignored, and the remaining items are sorted according to the order in header table 42 and stored in the database as a list of sorted items for the transaction (e.g., 44*a*). In the data structure, the server 11 then inserts ([p|P], R), where p is the first element of the sorted item list (e.g., 44*a*) and P is the rest of the sorted item list. If R has a child node with label p, then the server 11 increments its count by one. Otherwise, the server 11 creates a new node N in the data structure, with label p and parent R, and updates a node-link entry 100*c* in the header table 100. If P is not empty, then the server 11 recursively invokes the Insert (P,N) function.

The sequence of processing steps used to construct the FPTree 160 depicted in FIG. 2 begins with configuring the FPTree data structure stored in memory to identify a root 101. For the first item (f) 102 of the sorted items 44*a* in the first transaction 40*a* in the database, a link 103 to a first node 104 in the FPTree data structure is created that includes a counter which keeps track of the number of transactions that share that node. Thus, when the first node 104 is first created, the counter value is set to 1. Next, a link field 100*c* is added to the header table 100 for storing a pointer 105 that points to node(s) for that item using a chain of node links. For the next item (c) 106 of the sorted items 44*a*, a link 107 to a second node 108 is created that includes a counter which keeps track of the number of transactions that share that node (and is initially set to 1), and a pointer 109 to the second node is stored in the link field 100*c* of the header table 100. For the third item (a) 110 of the sorted items 44*a*, a link 111 to a third node 112 is created that includes a count for that node, and a pointer 113 to the third node is stored in the link field 100*c* of the header table 100. Continuing with the fourth item (m) 114 of the sorted items 44*a*, a link 115 to a fourth node 116 is created that includes a count for that node, and a pointer 117 to the fourth node is stored in the link field 100*c* of the header table 100. For the final item (p) 118 of the sorted items 44*a*, a link 119 to a fifth node 120 is created that includes a count for that node, and a pointer 121 to the third node is stored in the link field 100*c* of the header table 100.

As illustrated with the second transaction entry 40*b* in the database, its sorted entries meeting the support requirement are efficiently stored in the FPTree data structure by incrementing the counter for each pattern portion sharing a path through the FPTree with the first entry, so that new nodes are only created for the new pattern portions. In particular, for the first item (f) 122 of the sorted items 44*b* in the second transaction 40*b* in the database, the links 103, 105 pointing to the first node 104 are used, and the counter at node 104 is incremented by 1. For the next item (c) 124 of the sorted items 44*b*, links 107, 109 to the second node 108 are used, and the counter at node 108 is incremented by 1. Likewise, for the third item (a) 126 in the sorted items 44*b*, links 111, 113 are used, and the counter at node 112 is incremented by 1. However, with the fourth item (b) 128 of the sorted items 44*b*, a link 129 to a new node 130 is created that includes a count for that node, and a pointer 131 to the new node 130 is stored in the link field 100*c* of the header table 100. For the final item (m) 132 of the sorted items 44*b*, a link 133 to node 134 is created that includes a count for that node, and a pointer 135 to node 134 is stored at the fourth node 116, which was the previous node for this item (m).

Continuing with the third transaction entry 40*c*, the counter at node 104 is incremented for the first item (f) 136 of the sorted items 44*c*. For the next item (b) 138 of the sorted items 44*c*, a link 139 to a new node 140 is created that includes a count for that node, and a pointer 141 to the new node 140 is stored at the node 130, which was the previous occurrence of the b item in the tree.

As for the fourth transaction entry 40*d*, a link 143 from the root note 101 to node 144 is created to the first item (c) 142 of the sorted items 44*d* in the fourth transaction 40*d* in the database. In addition to including a counter at node 144, a pointer 145 to node 144 is stored at node 108. For the next item (b) 146 of the sorted items 44*d*, a link 147 to node 148 is created that includes a counter which keeps track of the number of transactions that share that node, and a pointer 149 to node 148 is stored at node 140. For the third item (p) 150 of the sorted items 44*d*, a link 151 to node 152 is created that includes a count for that node, and a pointer 153 to node 152 is stored at node 120.

The steps are repeated for the items in entry 40*e*. However, because this entry is identical to the first entry 40*a*, the result is that the counters in nodes 104, 108, 112, 116 and 120 are incremented. The final counter values after the sorted entries 44*a-e* are stored in the FPTree 160 are depicted in FIG. 2.

By using an FPTree representation of the frequent patterns contained in a database, frequent patterns from the FPTree that contain any frequent item "I" can be found by following the node links of I in the header table. For example, to find all frequent patterns containing item "c," link 109 in the header table 100 points to node 108, which includes a pointer 145 to node 144. The FPTree structure also permits efficient calculation of all frequent patterns for a given node N in a path, since only the prefix path of the node needs to be considered with a count equal to that of N.

In particular, with an FPTree data structure, FPGrowth techniques can efficiently mine frequent patterns from a transaction database by first finding all of the prefix paths involving an item "I." By treating these paths as a set of transactions, a conditional FPTree can be built from them by recursively invoking the FPGrowth sequence to mine frequent patterns on this conditional FPTree. As will be appreciated, an FPTree with a single path does not have to be recursively mined since its frequent patterns correspond to an enumeration of all combinations of items in the prefix path. To illustrate an example of the FPGrowth technique, consider the node P in the FPTree 160 shown in FIG. 2 which shows that there are two paths for reaching node P: {f:4, c:3, a:3, m:2, p:2} and {c:1, b:1, p:1}. Thus, the prefix paths to node P are {f:2, c:2, a:2, m:2} and {c:1, b:1}. If a conditional FPTree is generated from these prefix paths, only one item, c, with sufficient support is produced, resulting in only one path {c:3} that is the only frequent pattern for node P.

As will be appreciated by those of ordinary skill in the art, the generation of frequent patterns (also referred to as frequent sets) from a database is only part of the process of generating association rules. In particular, association rule mining algorithms typically require two steps: identifying all frequent patterns that satisfy a minimum support requirement, and generating all association rules that satisfy a minimum confidence requirement using the identified frequent patterns. The second step—generating association rules—may be accomplished by generating the power set of the frequent set (the set of all possible subsets) and then calculating, for each rule derivable from the members of the power set, the support, confidence, lift or other indicia of meaningfulness to determine if the rule meets the required thresholds.

Figure 3:
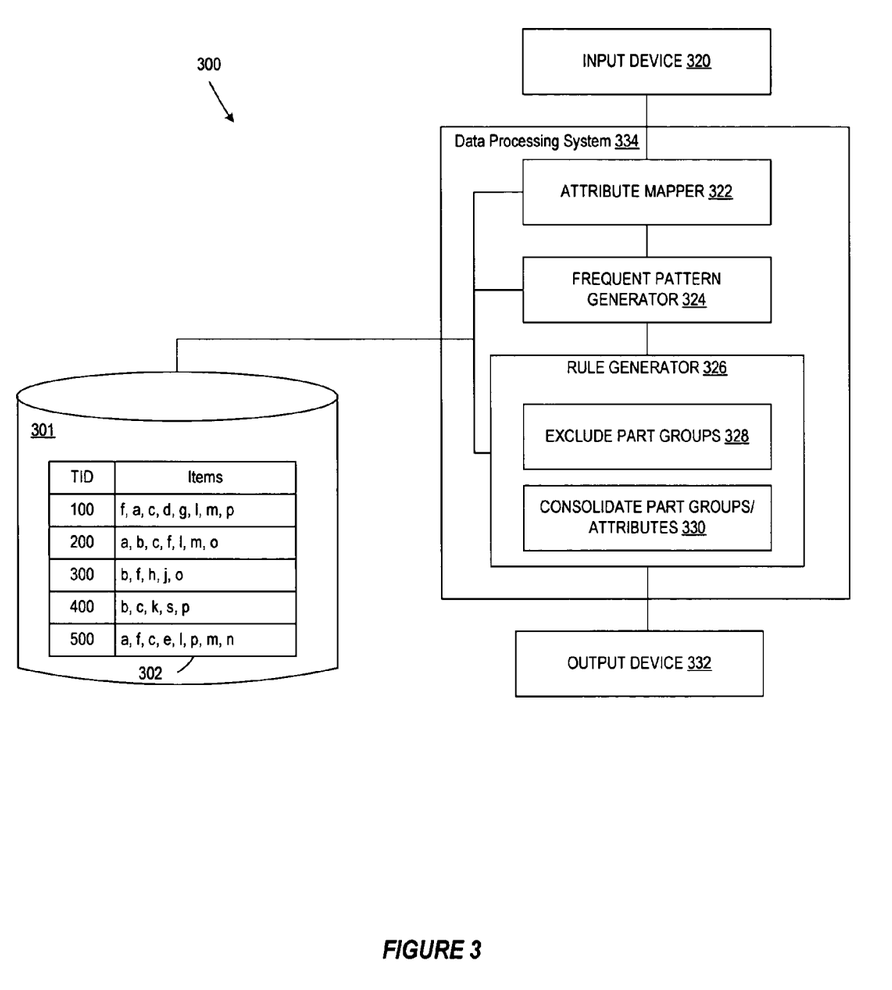
FIG. 3 depicts an exemplary system for mining attribute-based association rules from a transaction database.

FIG. 3 depicts an exemplary system for mining attribute-based association rules from frequent patterns identified in a transaction database. In FIG. 3, the system 300 comprises a data processing engine or unit 334 coupled to a database 301. The system 300 also includes an input device 320 where at least one condition of the association rules to be mined is inputted by a user. For example, the input device 320 is used to input the conditions (i.e., support, confidence, lift, etc.) for the association rule to be mined. An attribute mapper 322 is also included for mapping a first data set to a second, highly granular data set as described herein. In addition, a frequent pattern generator 324 is included for identifying frequent patterns occurring in the database 302. For example, the frequent pattern generator 324 may use FPGrowth techniques to identify frequent patterns in the database 302 meeting the minimum support count inputted by the user. At a general level, a rule generator 326 is included for generating association rules from the frequent pattern information, and an output device 332 is also provided for outputting the mined association rules. The database 301 may be connected to the attribute mapper 322, frequent pattern generator 324 and/or rule generator 326. Alternatively, transaction data from the database 301 may be transformed by the attribute mapper 322, passed directly to the frequent pattern generator 324 for processing to identify frequent patterns, and then passed to the rule generator 326 for rule generation.

The attribute mapper 322 is provided for transforming generic item descriptors in the transaction database to provide more detailed item description information concerning various product attributes and/or qualities for the item. For example, part number information may be mapped into more granular product or attribute information identifying specific features of the product, where the specific product or attribute information may be presented as native values. In addition, the mapping function may transform the product information to include more general information for the product, such as a Part Group or other generalized identifier for the product. Each of the transformed descriptors may be treated as separate items for use with the data mining techniques described herein to provide improved pattern correlation based on the more specific attribute information contained in the transaction data.

At the frequent pattern generator 324, all of the frequent patterns from the database 302 are compiled, and the support of each frequent pattern may be obtained. As will be appreciated, the use of attribute-based representations as items in a database results in a combinatorial explosion in the quantity of frequent pattern information that is output by the frequent pattern generator 324. For example, by expanding generic items into multiple attribute/value items, the transaction size of the frequent patterns may increase by four to five times. Using the example database 302 depicted in FIG. 3, the conventional approach for identifying products might only have a single item for transaction TID 100, but by expanding the items to include attribute values, the transaction TID 100 includes eight items—f, a, c, d, g, l, m and p.

At the rule generator 326, at least one association rule is derived by using the frequent pattern information provided by the frequent pattern generator 324. A broad variety of efficient algorithms for mining association rules have been developed in recent years, including algorithms based on the level-wise Apriori framework, TreeProjection and FPGrowth algorithms. However these algorithms may still have high processing times and cannot effectively be applied to the mining of highly granular transaction databases, such as generated with the attribute-based mapping methodology of the present invention. In particular, with the use of attribute-based items for the transaction database, there is a combinatorial explosion in the amount of data that the rule generation algorithms must examine. With the resulting increase in the frequent set size, the time required to generate association rules from a frequent set grows exponentially with the size of the frequent set. As a result, the available data mining techniques still in many cases have high processing times leading to increased I/O and CPU costs.

Various embodiments of the present invention may be applied to reduce the size of frequent sets that result from using attribute mapping. For example, where generic item descriptions in a first data set are expanded to include a Part Group identifier and to a set of attribute names and values, a first data mining module 328 in the rule generator 326 may be invoked to exclude or remove any Part Groups items from the frequent set generated by the frequent pattern generator 324.

As an additional or alternative approach, the size of the frequent set may be effectively reduced by generating the power set based on a consolidated version of the frequent set. For example, instead of generating the power set based on the full attribute-based frequent set output by the frequent pattern generator, the power set generation procedures implemented by the rule generator 326 may be expedited by generating subsets only for the Part Groups that the attributes in the frequent set represent. While there are a variety of ways to effect consolidation of the items in the frequent set, in a selected embodiment, the items in the frequent set are processed to determine which Part Groups are represented by the attributes in the frequent set. When these Part Groups are identified for any attributes in the frequent set, these attributes are replaced by a proxy value for purposes of power set generation. Consider, for example, a frequent set of {PG1, PG1A1, PG2, PG2A1} as being issued by frequent pattern generator 324. Instead of examining $(2^4-1)$ subsets—{PG1}, {PG1, PG1A1}, {PG1, PG1A1, PG2}, etc.—the frequent set may be consolidated replacing the two items representing a first Part Group (PG1, PG1A1) with a first proxy value (P1) and replacing the two items representing a second Part Group (PG2, PG2A1) with a second proxy value (P2). With this consolidation, the rule generator then only examines $(2^2-1)$ subsets {P1}, {P2} and {P1, P2} to see if the threshold requirements (support, confidence, etc.) have been met. When any rule meeting the threshold requirements is issued by the rule generator 326, the rule is unioned with the Part Group attributes. For example, if the threshold requirements were met, the rule {PG1, PG1A1} ⇒ {PG2, PG2A1} and its inverse would issue.

In an exemplary embodiment, the attribute-based association rule mining may be implemented with a data processing system that processes transaction database information to provide a frequent set with attribute-based items identifying the purchased product, and to more efficiently generate association rules from the generated frequent set. For example, data processing may be performed on computer system 10 which may be found in many forms including, for example, mainframes, minicomputers, workstations, servers, personal computers, internet terminals, notebooks, wireless or mobile computing devices (including personal digital assistants), embedded systems and other information handling systems, which are designed to provide computing power to one or more users, either locally or remotely. A computer system 10 includes one or more microprocessor or central processing units (CPU) 12, mass storage memory 14 and local RAM memory 15. The processor 12, in one embodiment, is a 32-bit or 64-bit microprocessor manufactured by Motorola, such as the 680X0 processor or microprocessor manufactured by Intel, such as the 80×86, or Pentium processor, or IBM. However, any other suitable single or multiple microprocessors or microcomputers may be utilized. Computer programs and data are generally stored as instructions and data in mass storage 14 until loaded into main memory 15 for execution. Main memory 15 may be comprised of dynamic random access memory (DRAM). As will be appreciated by those skilled in the art, the CPU 12 may be connected directly (or through an interface or bus) to a variety of peripheral and system components, such as a hard disk drive, cache memory, traditional I/O devices (such as display monitors, mouse-type input devices, floppy disk drives, speaker systems, keyboards, hard drive, CD-ROM drive, modems, printers), network interfaces, terminal devices, televisions, sound devices, voice recognition devices, electronic pen devices, and mass storage devices such as tape drives, hard disks, compact disk ("CD") drives, digital versatile disk ("DVD") drives, and magneto-optical drives. The peripheral devices usually communicate with the processor over one or more buses and/or bridges. Thus, persons of ordinary in the art will recognize that the foregoing components and devices are used as examples for sake of conceptual clarity and that various configuration modifications are common.

Figure 4:
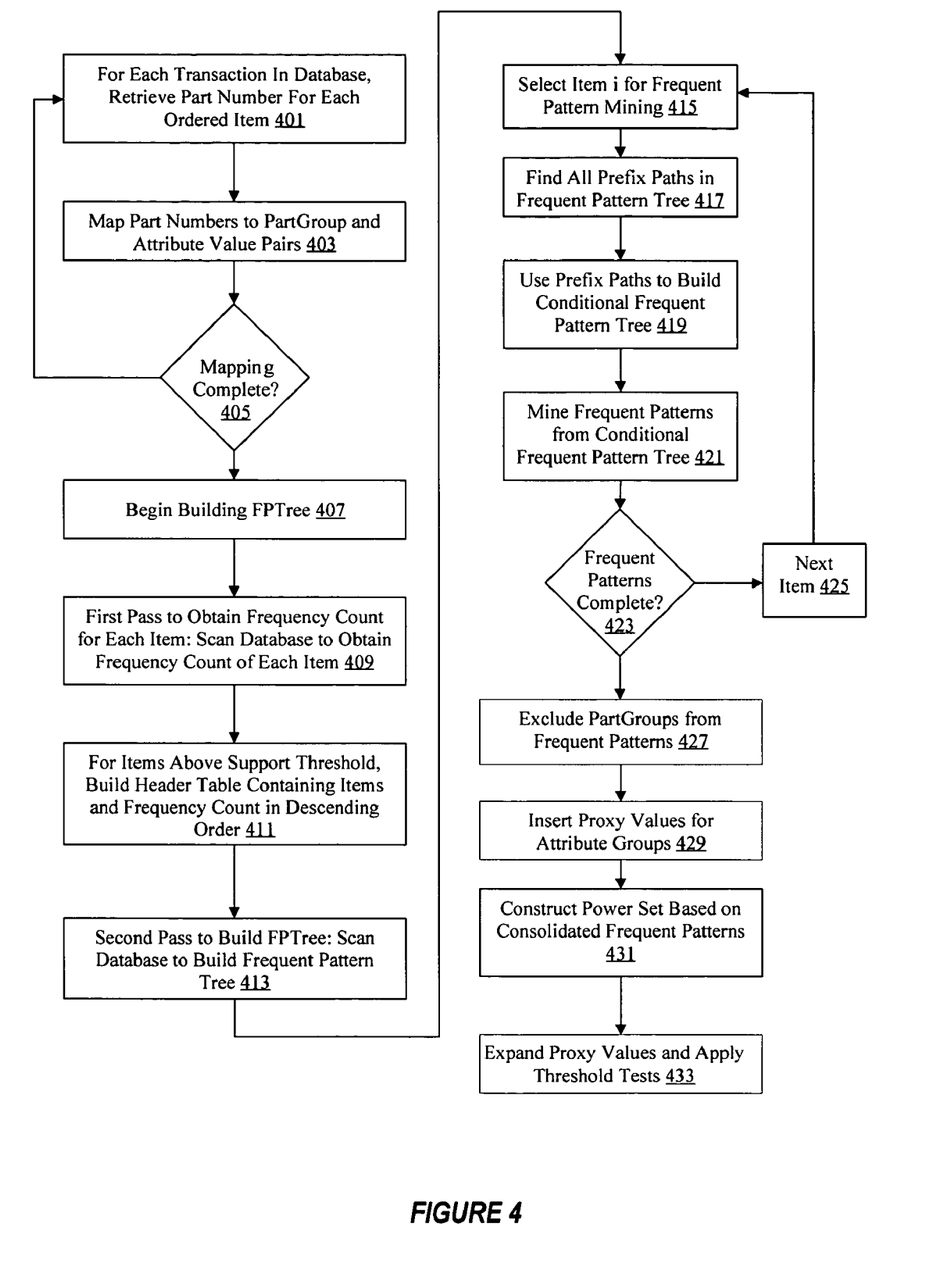
FIG. 4 shows a flowchart schematically illustrating the process of finding frequent patterns using a frequent pattern tree and mining attribute based association rules from the frequent pattern tree according to a selected embodiment of the present invention.

Turning now to FIG. 4, an exemplary flow methodology is illustrated for finding frequent patterns using a frequent pattern tree and mining attribute based association rules from the frequent pattern tree. As will be appreciated, the methodology illustrated in FIG. 4 shows the steps for generating attribute based items, for using an FPTree to identify a frequent set using FPGrowth techniques and for generating association rules from the attribute based items in the frequent set. These steps may be performed for each entry in a transaction database to expedite the generation of association rules having improved pattern correlation. In addition, it will be appreciated that the methodology of the present invention may be thought of as performing the identified sequence of steps in the order depicted in FIG. 4, though the steps may also be performed in parallel, in a different order, or as independent operations that separately identify and store a frequent set and generate association rules therefrom.

The description of the method can begin at step 401, where an item corresponding to an ordered part number is retrieved from a first data set in a transaction database. Each retrieved part number is transformed or mapped into a Part Group item and attribute value pairs at step 403, thereby creating a second data set. For a given database, each retrieved part number is transformed until the mapping is complete (affirmative outcome to decision 405).

Once the second data set is complete, the process of constructing an FPTree begins at step 407 by making a first pass through the second (mapped) data set to obtain a frequency count for each item in the second data set. For items identified at step 409 that are above the minimum support threshold requirement, a header table is built at step 411 that lists the items and frequency count in descending order. Next, a second pass through the second data set is made at step 413 to build the FPTree by sorting the frequent items in a transaction based on header table order, merging the transactions with identical item sets and having transactions with the same prefix share the same path in the tree. At the conclusion of step 413, the FPTree data structure is completed and stored in memory, and may be used with the FPGrowth technique to generate the frequent patterns or frequent set.

In particular, the FPGrowth technique selects an item at step 415, finds all prefix patterns in the FPTree for that item at step 417 and uses the prefix paths to build a conditional FPTree at step 419. With the conditional FPTree, frequent patterns are mined for each selected item (step 421), and the process repeats until all items have been processed (affirmative outcome to decision 423). At this point (which corresponds to the output of frequent pattern generator 324 in FIG. 3), the process of generating rules from the frequent set may begin. However, by virtue of transforming the first data set to represent items in terms of their features (such as part groups and attribute-value pairs) to provide sufficient detail so that association rule mining can be used for complex products, the representation at this level results in a combinatorial explosion in the amount of data that the rule generation algorithms must examine. To manage that combinatorial explosion, selected attribute and part group items may be consolidated during the subset generation process. As illustrated at step 427, the Part Group items may be excluded from the frequent set, at least where the frequent set already contains attribute values corresponding to the Part Group. In addition or in the alternative, all item references for the same part group may be considered as a unit by inserting a proxy value in their place during the power set generation process (as indicated at step 429). Once the attribute values are consolidated, the power set is generated based on the consolidated proxy values (step 431). After the subsets are generated, the subsets are expanded by replacing the proxy values with the original attribute values, and then the threshold tests are applied to generate association rules that meet the threshold requirements (step 433).

The above-discussed embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to improve the attribute based rule mining. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

The computer-based data processing system described above is for purposes of example only, and may be implemented in any type of computer system or programming or processing environment, or in a computer program, alone or in conjunction with hardware. It is contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

As set forth above, the methods and systems for efficiently mining attribute based association rules as shown and described herein may be implemented in software stored on a computer-readable medium and executed as a computer program on a general purpose or special purpose computer. The processing of transaction data, for example, can be implemented in a software application, such as the Trilogy Sales Optimizer. For clarity, only those aspects of the system germane to the invention are described, and product details well known in the art are omitted. For the same reason, the computer hardware is not described in further detail. It should thus be understood that the invention is not limited to any specific computer language, program, or computer. While various details are set forth in the above description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of microprocessor design to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A computer-based method of mining one or more patterns from an input data set of items, comprising: identifying one or more generic items in the input data set; transforming the input data set into a second data set by mapping each identified generic item into a set of items based on attribute names and values corresponding to the identified generic item; extracting a frequent set from the second data set by identifying each set of items that meets a minimum support threshold requirement; identifying attribute-based items in the second data set relating to a part group; inserting a proxy item in place of the identified attribute-based items to produce a reduced frequent set generating association rules based on the reduced frequent set by constructing a power set based on the reduced frequent set, replacing a proxy item in the power set with one or more corresponding attribute based items and applying predetermined threshold requirement to the power set to identify at least one association rule.

2. The method of claim 1, where the attribute names and values comprise native values.

3. The method of claim 1, where identifying one or more generic items in the input data set comprises identifying part number items in the input data set.

4. The method of claim 1, where the attribute names and values comprise time sensitive quantitative values.

5. The method of claim 1, further comprising transforming the input data set into the second data set by mapping each identified generic item into a product group item corresponding to the identified generic item, where removing redundant items comprises extracting the product group item from the frequent set to produce the reduced frequent set.

6. The method of claim 1, where extracting a frequent set from the second data set comprises building a representation of frequent patterns.

7. The method of claim 1, wherein extracting a frequent set from the second data set comprises building a frequent pattern tree using two passes through the second data set.

8. An article of manufacture having a computer readable medium having stored thereon executable instructions and data which are executed by at least one processing device to cause the at least one processing device to: transform at least one item in a transaction database into a plurality of attribute-based items to form a first data set; process the first data set to identify a frequent set for power set generation; consolidate the frequent set by replacing a plurality of attribute-based items in the frequent set with a corresponding proxy item; generate subsets in the power set; expand the subsets by replacing each proxy item in the subsets with the corresponding plurality of attribute-based items in the frequent set; and apply a threshold test to the expanded subsets to identify at least one attribute based association rule.

9. The article of manufacture of claim 8, wherein the at least one processing device applies a threshold test by calculating a support value, confidence value and lift value for each rule derivable from the expanded subsets.

10. The article of manufacture of claim 8, wherein the executable instructions and data, when executed by the at least one processing device, cause the at least one processing device to:
    transform the at least one item in the transaction database into a generic item and the plurality of attribute-based items to form the first data set;
    process the first data set to identify a frequent set for power set generation;
    consolidate the frequent set by removing any generic item in the frequent set and replacing the plurality of attribute-based items in the frequent set with the corresponding proxy item;
    generate subsets in the power set;
    expand the subsets by replacing each proxy item in the subsets with the corresponding plurality of attribute-based items in the frequent set.

11. The article of manufacture of claim 8, wherein the first data set is processed to identify the frequent set by building a frequent pattern tree representing items in the first data set that meet a predetermined support threshold requirement.

12. The article of manufacture of claim 8, wherein the first data set is processed to identify the frequent set by building a frequent pattern tree using two passes through the first data set.

13. A system for mining attribute-based association rules, comprising:

a memory;

a processor;

a database for storing a plurality of transactions, where each transaction comprises at least one purchase item which comprises a part number descriptor; a processing engine to transform a purchase item in the database to a plurality of attribute-based items corresponding to the purchase item based on the part number descriptor, thereby generating an attribute-based data set, and to identify a frequent set in the attribute-based data set; and a rule generator for generating association rules from the frequent set, said rule generator comprising means for consolidating any attribute-based items in the frequent set that correspond to the part number descriptor by replacing said attribute-based items with a corresponding proxy item, thereby forming a reduced frequent set; means for generating a power set based on the reduced frequent set; means for expanding the power set by replacing any proxy item with its corresponding attribute based items, thereby forming an expanded power set.

14. The system of claim 13, wherein the rule generator comprises means for applying threshold tests to the expanded power set.

15. The system of claim 13, wherein the processing engine transforms the purchase item into a part group item and a plurality of attribute-based items corresponding to the purchase item, and where the rule generator comprises a means for excluding any part group items from the frequent set to generate the reduced frequent set.

16. The system of claim 13, wherein the processing engine comprises a means for generating a frequent pattern tree that is used to identify the frequent set.

* * * * *